(12) United States Patent
Swarts (10) Patent No.: US 9,845,062 B2
(45) Date of Patent: Dec. 19, 2017

(54) UNIVERSAL SEWER INLET FITTING

(71) Applicant: LIPPERT COMPONENTS MANUFACTURING, INC., Elkhart, IN (US)

(72) Inventor: Douglas R. Swarts, Hollister, CA (US)

(73) Assignee: Lippert Components Manufacturing, Inc., Elkhart, IN (US)

(*) Notice: Subject to any disclaimer, the term of this patent is extended or adjusted under 35 U.S.C. 154(b) by 184 days.

(21) Appl. No.: 14/919,479

(22) Filed: Oct. 21, 2015

(65) Prior Publication Data

US 2016/0109047 A1 Apr. 21, 2016

Related U.S. Application Data

(60) Provisional application No. 62/066,463, filed on Oct. 21, 2014.

(51) Int. Cl.
*B60R 15/00* (2006.01)
*F16K 3/18* (2006.01)
*F16K 3/20* (2006.01)

(52) U.S. Cl.
CPC ............ *B60R 15/00* (2013.01); *F16K 3/18* (2013.01); *F16K 3/20* (2013.01)

(58) Field of Classification Search
CPC ............ B60R 15/00; Y10T 137/7043; Y10T 137/7058; Y10T 137/7051; Y10T 137/7062; E05F 3/12; B65D 47/04; F16K 3/18; F16K 3/184; F16K 3/186; F16K 3/20; F16K 3/205; A47B 97/00
USPC ....... 138/89, 90, 92, 96 R; 220/345.1–345.3, 220/345.5, 348, 351; 251/143, 144, 147, 251/148, 149, 149.3, 153–156, 299, 300, 251/349
See application file for complete search history.

(56) References Cited

U.S. PATENT DOCUMENTS

| | | | | |
|---|---|---|---|---|
| 698,558 A | * | 4/1902 | Rosenbaum | A45C 3/00 190/111 |
| 3,672,403 A | * | 6/1972 | Wilson | F16L 55/1157 138/89 |
| 3,819,137 A | * | 6/1974 | Smith | F16L 3/16 138/106 |
| 3,998,426 A | * | 12/1976 | Isbester | E02B 8/04 251/147 |
| 4,693,278 A | * | 9/1987 | Wilson | F16J 13/10 138/89 |
| 4,693,389 A | * | 9/1987 | Kalen | G21C 13/067 138/89 |
| 4,945,951 A | * | 8/1990 | Beamer | B65D 39/00 138/89 |
| 4,948,550 A | * | 8/1990 | Worthy | G21C 13/067 138/89 |
| 5,209,257 A | * | 5/1993 | Baker, Jr. | E03F 5/08 137/192 |
| 5,324,001 A | * | 6/1994 | Duke | B60R 15/00 251/147 |

(Continued)

*Primary Examiner* — Craig Schneider
*Assistant Examiner* — Frederick D Soski
(74) *Attorney, Agent, or Firm* — Barnes & Thornburg LLP (57) ABSTRACT

A nozzle is configured for interaction with a sewer inlet fitting. The sewer inlet fitting is configured for connection to a sewer inlet of a sewer system or sewage receptacle. The sewer inlet fitting includes a cover operable between open and closed conditions by action of the nozzle being inserted thereinto and withdrawn therefrom.

25 Claims, 12 Drawing Sheets

(56) References Cited

U.S. PATENT DOCUMENTS

| | | | | |
|---|---|---|---|---|
| 5,417,460 A * | 5/1995 | Lunder | ............. | B60R 15/00 285/242 |
| 5,904,183 A * | 5/1999 | Leech | ............. | B60R 15/00 137/355.16 |
| 5,947,156 A * | 9/1999 | Tomczyk | ............. | B60R 15/00 137/355.16 |
| 6,161,589 A * | 12/2000 | Bolotte | ............. | F16L 5/02 138/106 |
| 6,352,086 B1 * | 3/2002 | Harper | ............. | B60R 15/00 137/384.2 |
| 6,360,779 B1 * | 3/2002 | Wagner | ............. | F16L 55/105 138/89 |
| 6,543,484 B1 * | 4/2003 | Highsmith | ............. | B60R 15/00 137/240 |
| 6,746,178 B1 * | 6/2004 | Hensley | ............. | B60R 15/00 138/110 |
| 6,769,291 B1 * | 8/2004 | Julian | ............. | G01M 3/022 138/90 |
| 6,786,462 B1 * | 9/2004 | Bland | ............. | B60R 15/00 248/505 |
| 7,156,574 B1 * | 1/2007 | Garst | ............. | B60R 15/00 137/181 |
| 8,413,954 B1 * | 4/2013 | Burrow | ............. | B65B 39/001 251/147 |
| 9,211,847 B1 * | 12/2015 | Cox | ............. | B60R 15/00 |
| 2002/0079017 A1 * | 6/2002 | Fields | ............. | B60R 15/00 141/65 |
| 2007/0062953 A1 * | 3/2007 | Lin | ............. | B65F 1/16 220/345.5 |
| 2007/0210215 A1 * | 9/2007 | Prest | ............. | F16L 3/26 248/80 |
| 2009/0236001 A1 * | 9/2009 | Damaske | ............. | B60R 15/00 137/899 |
| 2010/0018590 A1 * | 1/2010 | Damaske | ............. | B60R 15/00 137/351 |
| 2015/0292662 A1 * | 10/2015 | Majocka | ............. | E03F 5/0407 138/96 R |
| 2017/0050619 A1 * | 2/2017 | Greene | ............. | B60R 99/00 |

* cited by examiner

UNIVERSAL SEWER INLET FITTING

CROSS REFERENCE TO RELATED APPLICATION

This application claims benefit of U.S. Provisional Patent Application No. 62/066,463, filed on Oct. 21, 2014, and incorporates by reference the disclosure thereof in its entirety.

BACKGROUND OF THE DISCLOSURE

The disclosure relates to sewer inlets configured to receive sewage and waste water from recreational vehicles (RVs) and the like. RV park sewer inlet configurations may vary from park-to-park. This may be a function of local codes and standards or for other reasons. The lack of sewer inlet standardization can result in sewage and waste water spills and ground contamination because a given sewer inlet might not be configured to receive a given RV's sewer discharge hose or nozzle in secure and/or fluid tight engagement.

DETAILED DESCRIPTION OF THE DRAWINGS

Terms of orientation as may be used herein generally should be construed as referring to relative orientation of components and not to absolute orientation unless context clearly dictates otherwise.

The drawings show an illustrative sewage or waste water discharge nozzle as might be provided for use in draining effluent, sewage, and/or waste water from a recreational vehicle or the like. The drawings also show various illustrative sewer inlet fittings that may be permanently or otherwise connected to an inlet of a sewer system or sewage receptacle as might be found in an RV park. The sewer inlet fittings include covers operable between open and closed positions. A spring or other biasing mechanism may be provided to bias the covers to the closed position. Interaction of the nozzle with the covers may be sufficient to overcome the biasing force such that engagement of the nozzle with the covers causes the covers to open such that the nozzle may be inserted into the fitting without a user directly handling the covers. The biasing mechanism may cause the covers to close when the nozzle is withdrawn from the fitting. In other embodiments, the nozzle could be a hose end or other fitting configured for interaction with the sewer inlet.

Figure 1:
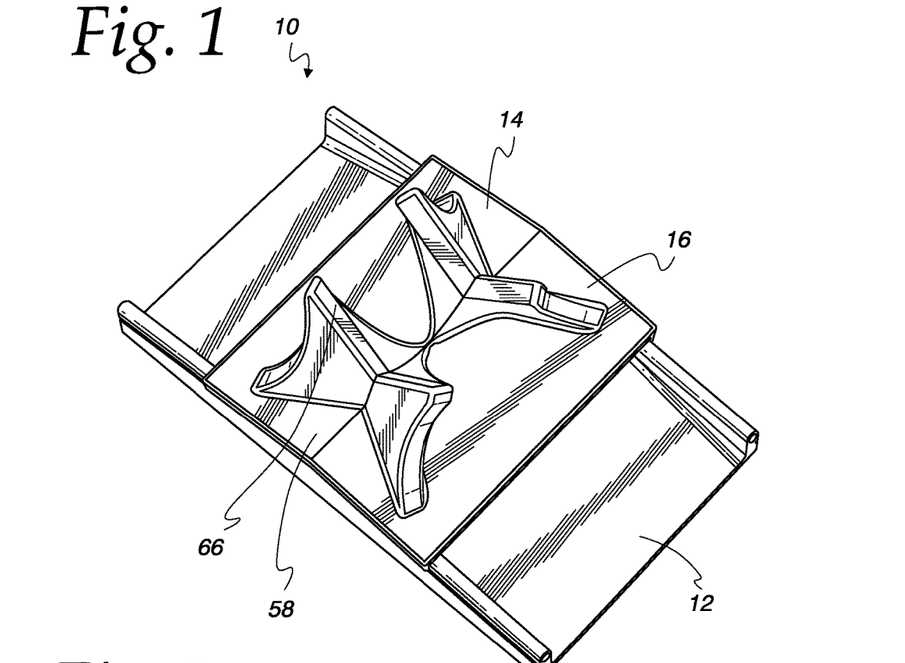
FIG. 1 is a perspective view of an illustrative sewer inlet fitting according to the present disclosure.
Figure 2:
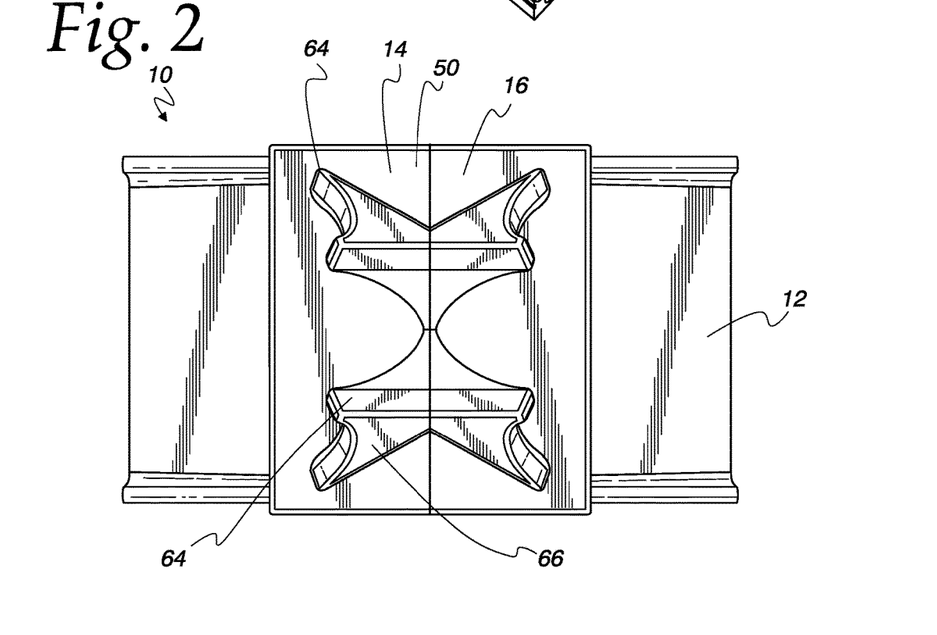
FIG. 2 is a top plan view of the illustrative sewer inlet fitting of FIG. 1.

FIGS. 1-11B show a first illustrative embodiment of a sewer inlet fitting 10. The fitting 10 includes a base 12 and first and second covers 14, 16. As best shown in FIG. 2, the base 12 includes a generally planar central portion 18 defining an inlet port 20 having a longitudinal axis 21. First and second generally planar side portions 22, 24 extend laterally from opposing end edges of the central portion 18. As shown, the first and second side portions 22, 24 also may extend downwardly from the central portion 18, thereby defining ramped portions.

First and second side walls 26, 28 abut and extend from respective opposite sides of the central portion 18 and the first and second side portions 22, 24 in directions generally perpendicular thereto. As such, the first and second sidewalls 26, 28 extend upwardly above upper surfaces of the central portion 18 and the first and second side portions 22, 24.

Figure 13A:
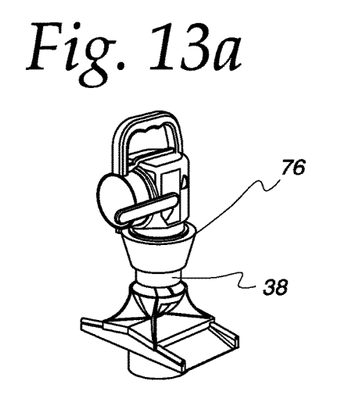
FIGS. 13A-13F are perspective views of a nozzle interacting with the illustrative sewer inlet fitting of FIG. 12.
Figure 13B:
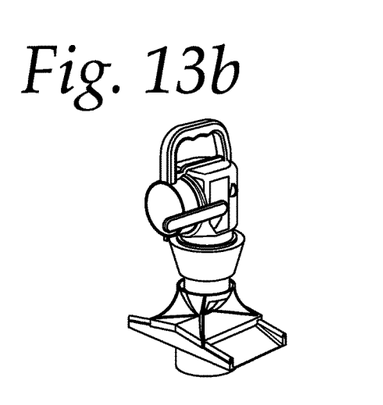
Figure 13C:
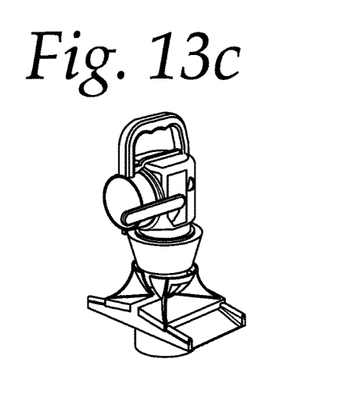
Figure 13D:
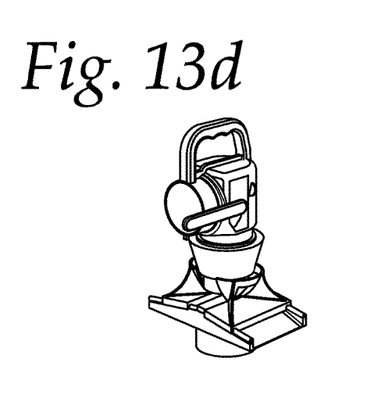
Figure 13E:
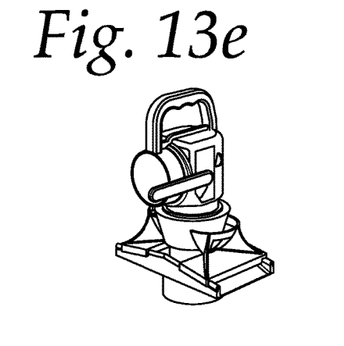
Figure 13F:
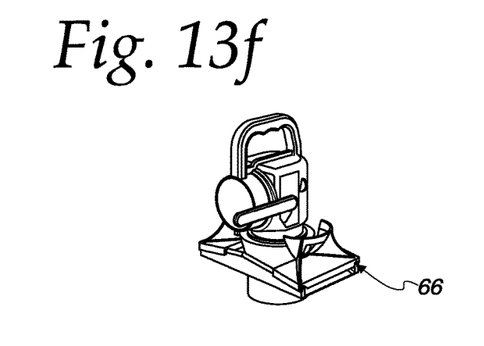

An outlet sleeve 30 defining an outlet port 32 collinear and coextensive with the inlet port 20 and axis 21 extends downwardly from the central portion 18. A lower portion 34 of the outlet sleeve 30 may be generally annular and configured to be received by a sewer inlet pipe or fitting (see, for example, FIG. 6). An upper portion 36 of the outlet sleeve 30 may be tapered or truncated conical to facilitate receipt of an annular waste discharge nozzle 38 (see, for example, FIG. 13A) therein. For example, the inner surface of the upper portion 36 of the outlet sleeve may taper at a 45 degree angle relative to the longitudinal axis 21 of the inlet port 20. As such, the inlet port 20 may have a larger diameter than the outlet sleeve 30 and the outlet port 32.

The upper edges of the first side wall 26 define first and second slide rails 40, 42. The upper edges of the second side wall 28 define third and fourth slide rails 44, 46. The first through fourth slide rails 40, 42, 44, 46 may be identical to or mirror images of each other. As such, only the first slide rail will be described in detail herein.

The first slide rail 40 defines a hemispherical or other curved upper surface 48 configured for sliding engagement with a respective groove or slot of first cover 14, as will be discussed further below. In another embodiment, the upper surface 48 of the first slide rail 40 and the corresponding surface of the first cover 14 may have other complementary profiles or shapes.

The first slide rail 40 may define a tubular region 54 for receiving a spring 56. The spring 56 may be a helical extension spring having a first retention hook 74 at a first end thereof and a second retention hook 76 at a second end thereof. Further, the first slide rail 40 may define a groove 50 for receiving a respective tab of the first cover 14 and a slot 52 allowing engagement of the first cover 14 with the second retention hook 76 at the second end of the spring 56, as will be discussed further below.

The first and second covers 14, 16 may be identical to or mirror images of each other. As such, only the first cover 14 will be described herein in detail. The first cover 14 includes a generally planar top portion 58. First and second opposing side portions 60 extend downwardly from the top portion 58, generally perpendicular thereto. A tab portion 62 extends inwardly and generally perpendicularly from the lower end of each side portion 60. Each tab portion 62 is configured for sliding engagement with the corresponding groove 50 in the respective slide rail 40, 44. A front portion 64 may extend downwardly from the top portion 58 and inwardly from the side portions 60. Where provided, the front portion 64 defines generally U-shaped notches 66 configured to receive the upper edge of the respective slide rail 40, 44 in sliding engagement therewith.

Figure 11:
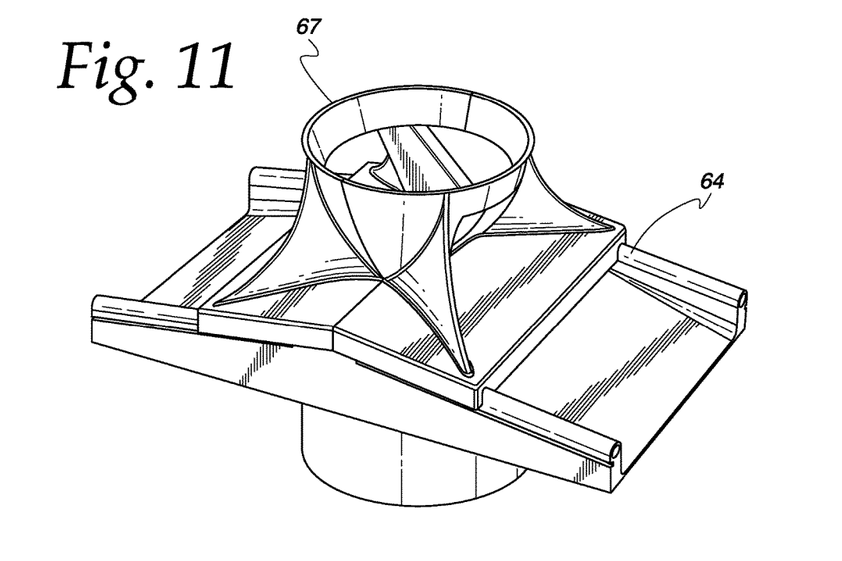
FIGS. 11A and 11B are perspective partial cut-away views of a portion of a base of an illustrative sewer inlet fitting according to the present disclosure.
Figure 12A:
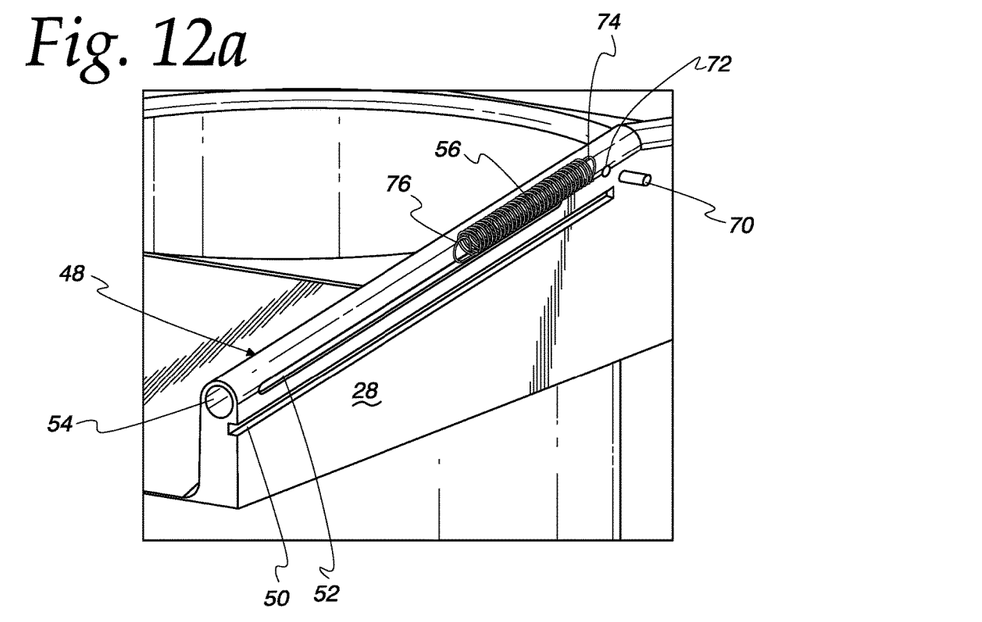
FIG. 12 is a perspective view of another illustrative sewer inlet fitting according to the present disclosure.
Figure 12B:
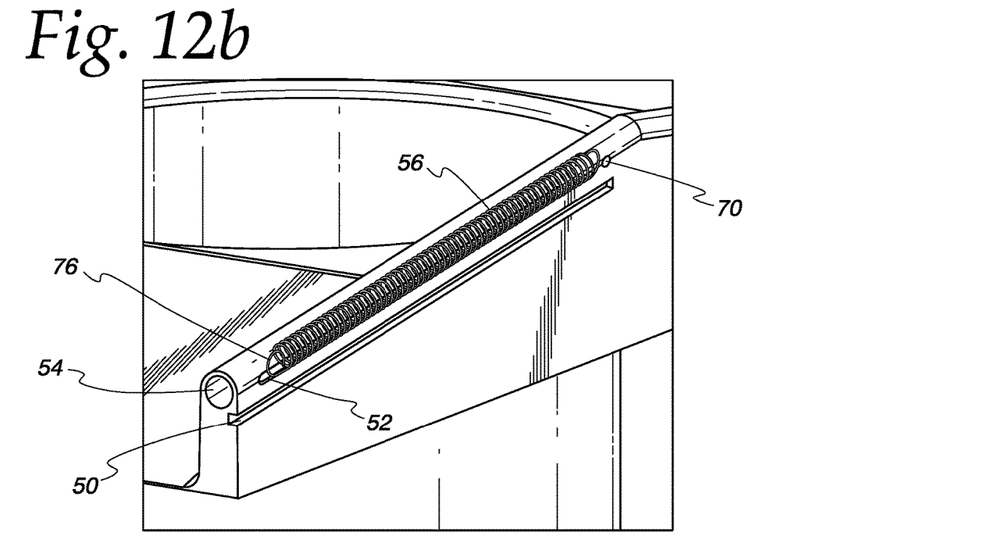

First and second guide fins 64 extend upwardly from the top portion 58 of the first cover 14. Each of the first and second guide fins 64 defines a planar guide surface 66 configured to receive the nozzle 38 in sliding engagement. Each guide surface 66 is oriented at an angle oblique to the longitudinal axis 21 of the inlet port 20 and outlet sleeve 30. In a second embodiment, as shown in FIG. 11, the guide fins may be connected by a ramped hemispherical section defining a ramped hemispherical guide surface 67.

The first cover 14 may be assembled to the base 12 by inserting a spring 56 into the tubular region 54 of the first slide rail 40 and attaching the first retention hook 74 of the spring to the first guide rail by inserting a pin 70 through the first retention hook and one or more respective pin-receiving apertures 72 defined by the first slide rail. Another spring 56 may be similarly inserted into the tubular region 54 of the third slide rail 44 and attached thereto.

The first cover 14 may be attached to the second retention hooks 76 of the respective springs 56 in the first and third slide rails by inserting pins 72 through the respective second retention hooks and through corresponding apertures 74 in the side walls 60 of the first cover.

The second cover 16 may be assembled to the base 12 in a similar manner.

Figure 3:
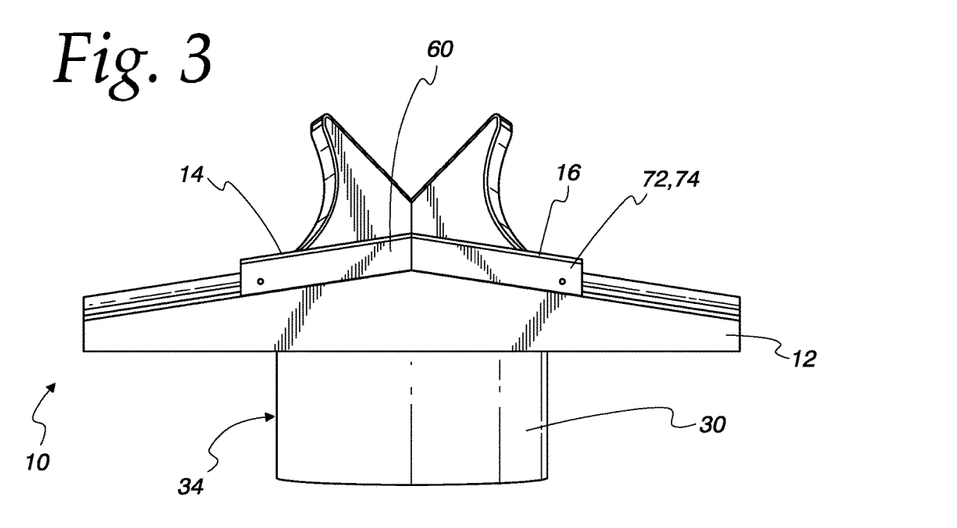
FIG. 3 is a side elevation view of the illustrative sewer inlet fitting of FIG. 1.

So assembled, the springs 56 bias the first and second covers 14, 16 to closed positions as shown, for example, in FIGS. 1-3. As such, each of the first and second covers 14, 16 normally covers a respective portion of the inlet port 20.

Figure 15:
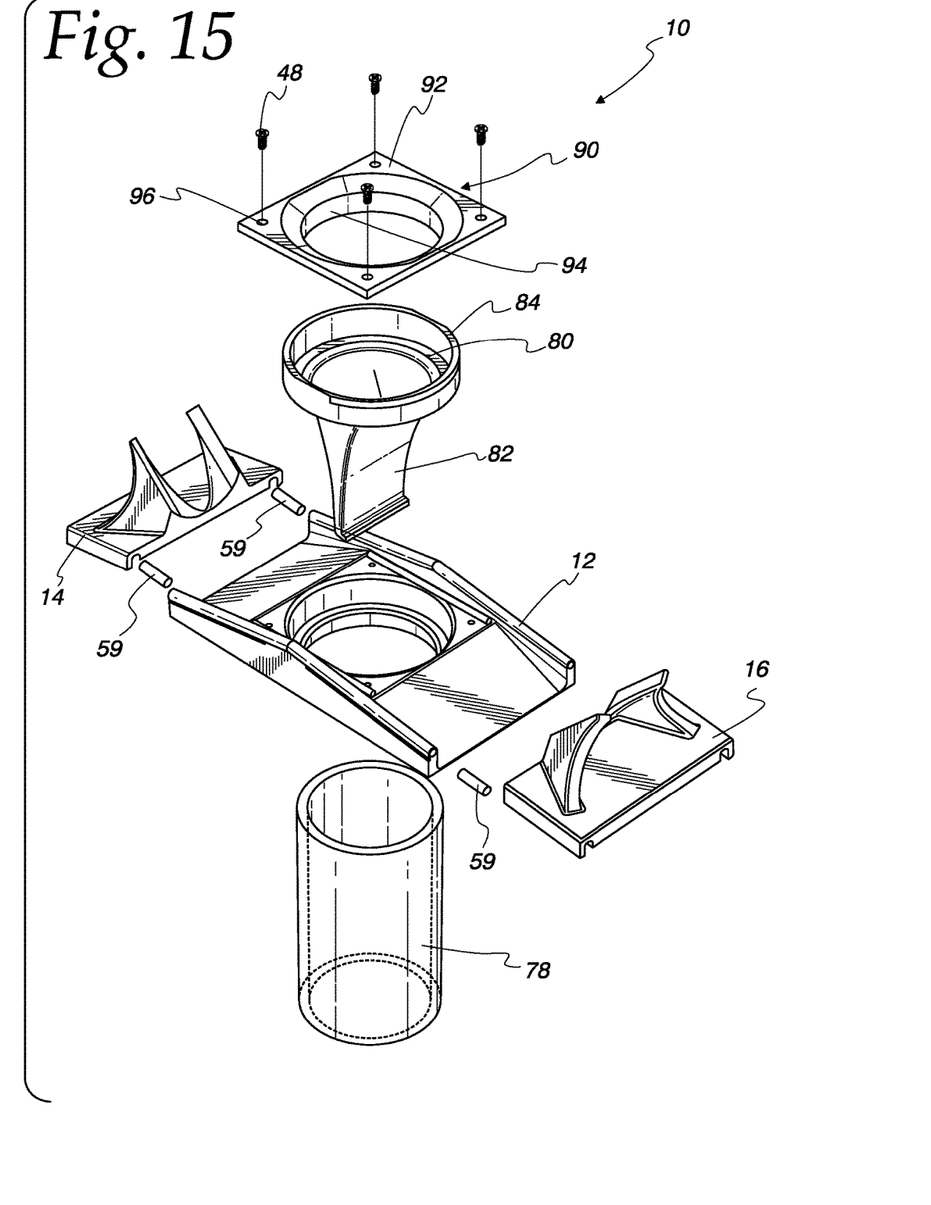
FIG. 15 is an exploded perspective view of a further illustrative sewer inlet fitting according to the present disclosure.
Figure 16A:
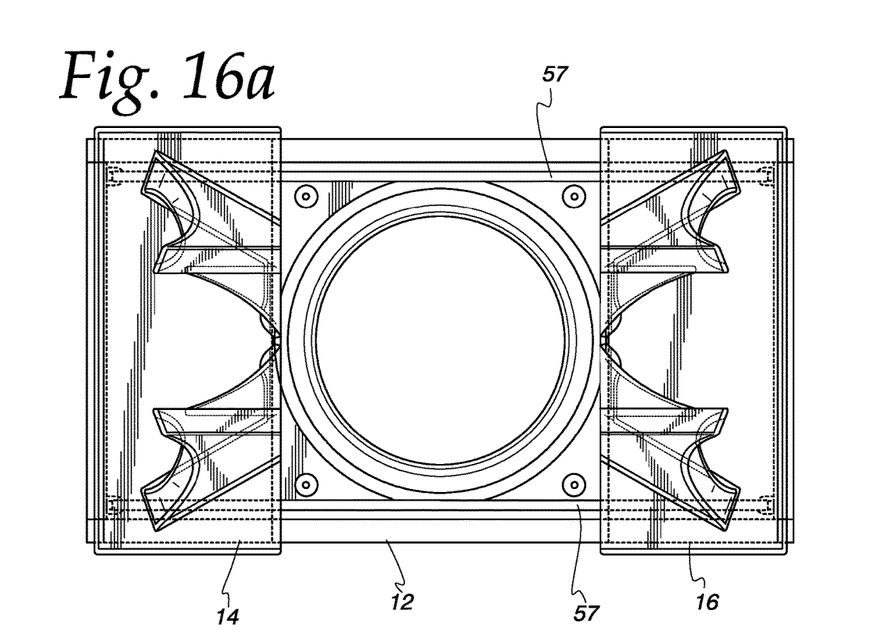
FIGS. 16A-16C are perspective views of yet another illustrative sewer inlet fitting according to the present disclosure having covers in various states of closure.
Figure 16B:
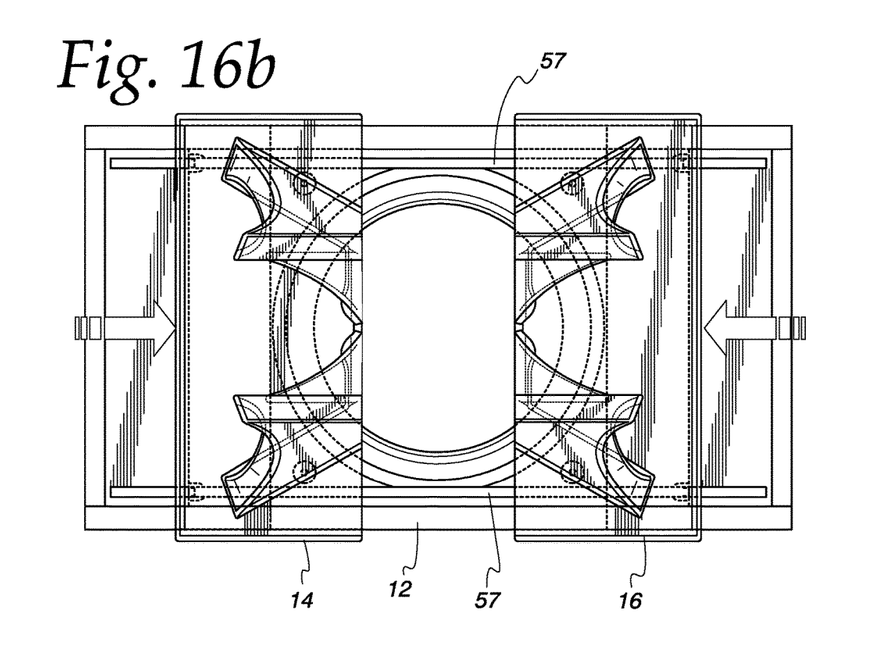
Figure 16C:
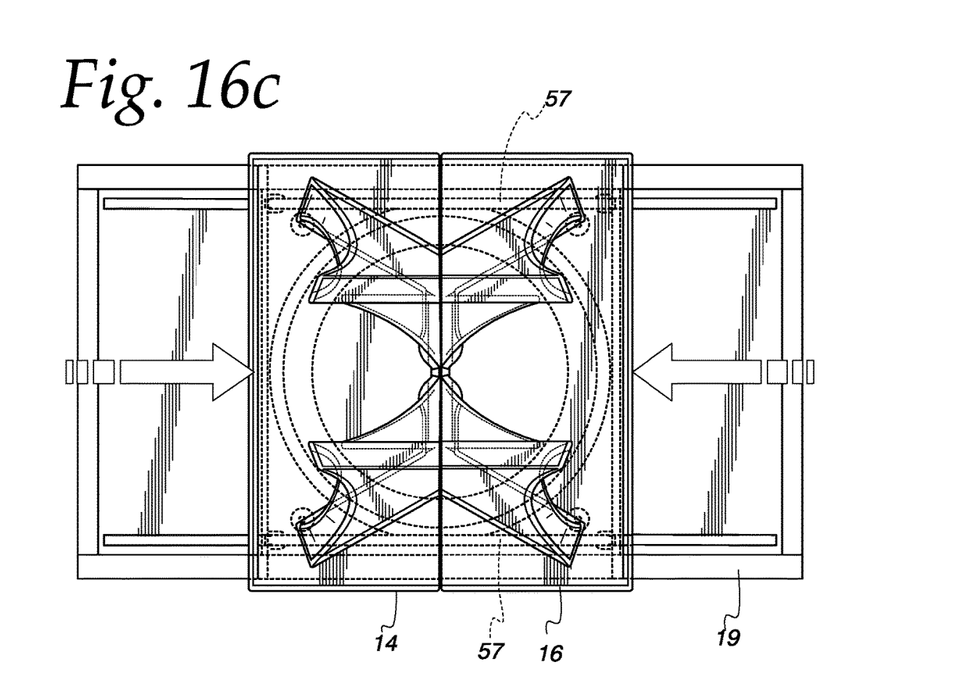

In other embodiments, other biasing mechanisms could be provided to bias the first and second covers 14, 16 to the foregoing closed positions. For example, one or elastomeric bands could be connected between the base 12 and the first and second covers 14, 16. Alternatively, as shown in FIGS. 16A-16C, one or more elastomeric bands could be connected between the first and second covers 14, 16 and biased to pull the first and second covers toward each other and toward their respective closed positions. In yet another embodiment, as shown in FIG. 15, gas struts 59 or the like could be provided to bias the first and second covers 14, 16 toward their respective closed positions.

Figure 6:
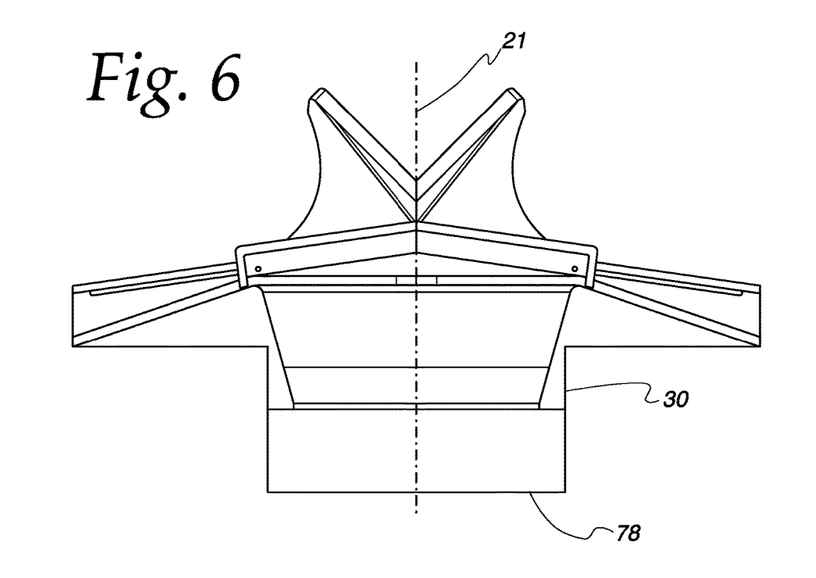
FIG. 6 is a cross-sectional side elevation view of the illustrative sewer inlet fitting of FIG. 1 in a closed position.
Figure 7:
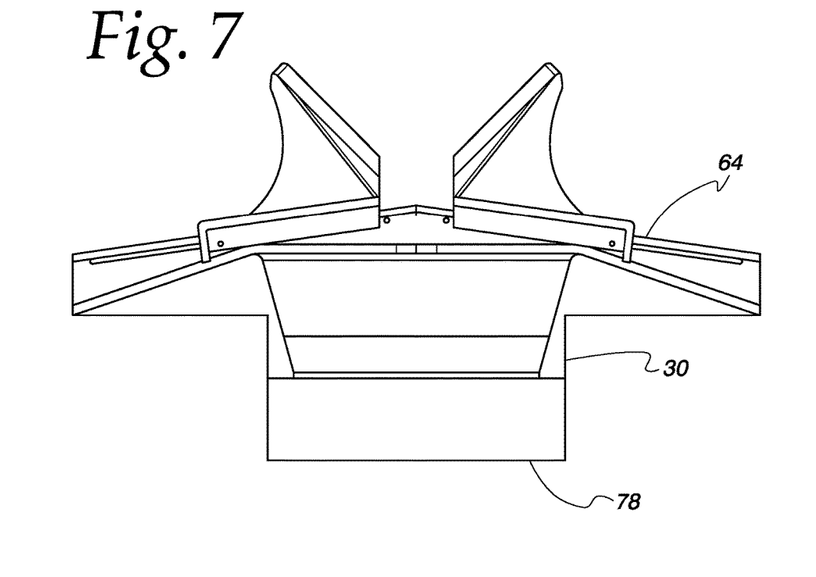
FIG. 7 is a cross-sectional side elevation view of the illustrative sewer inlet fitting of FIG. 1 in a first partially open position.
Figure 8:
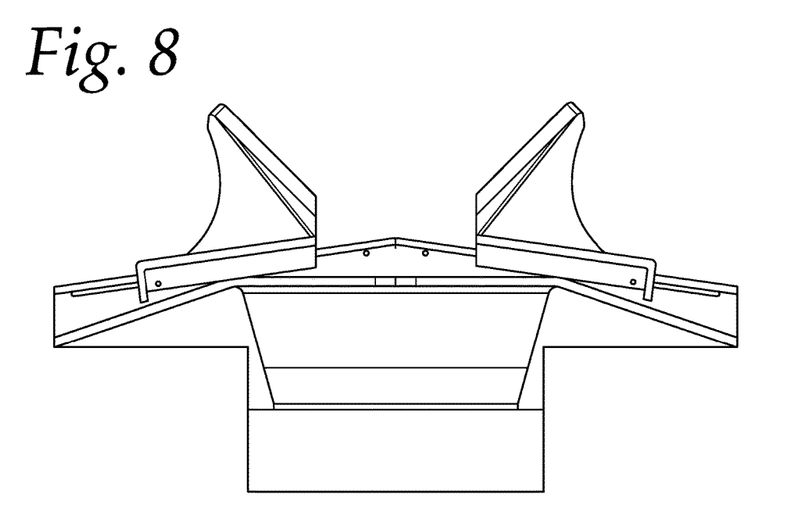
FIG. 8 is a cross-sectional side elevation view of the illustrative sewer inlet fitting of FIG. 1 in a second partially open position.
Figure 9:
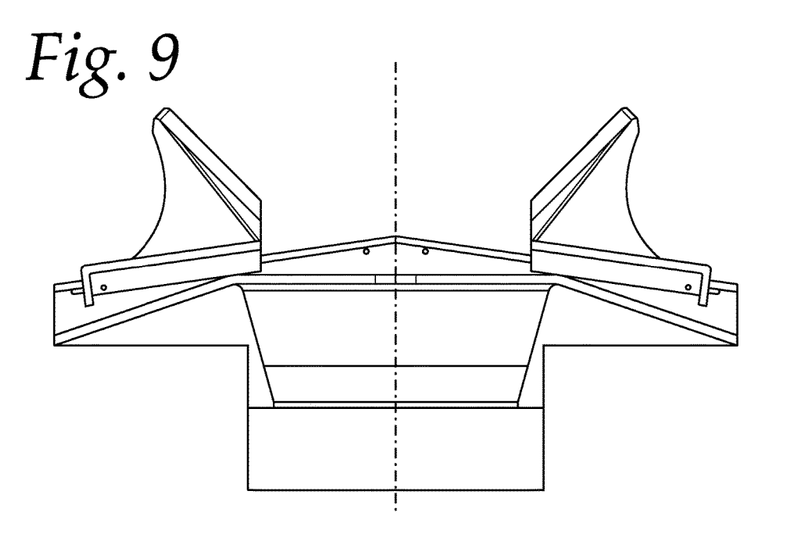
FIG. 9 is a cross-sectional side elevation view of the illustrative sewer inlet fitting of FIG. 1 in a third partially open position.
Figure 10:
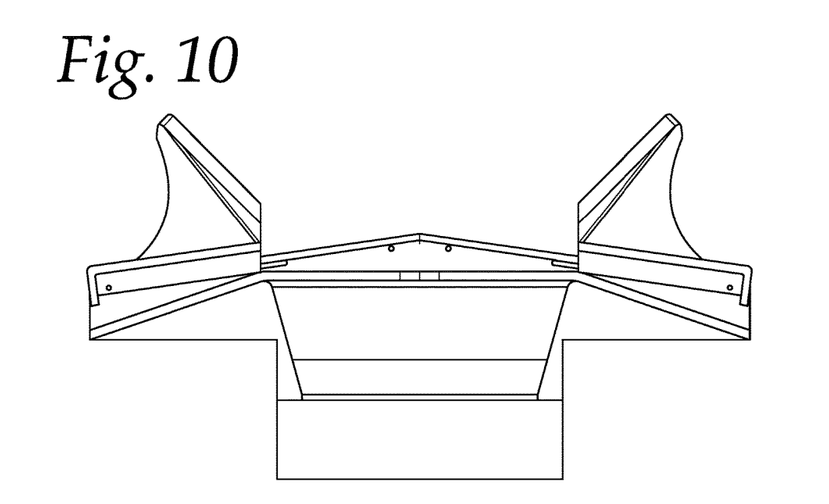
FIG. 10 is a cross-sectional side elevation view of the illustrative sewer inlet fitting of FIG. 1 in a fully open position.

A user may insert the nozzle 38 into the fitting 10 without actually touching the first and second covers 14, 16 by engaging the nozzle with the guide surfaces 66 of the guide fins 64 of the first and second covers and moving the nozzle 38 toward the inlet port 20 along the longitudinal axis 21. Because the guide surfaces 66 of the guide fins 64 are angled with respect to the longitudinal axis 21 as shown in the drawings and as described above, further movement of the nozzle 38 toward the inlet port 20 imparts a side load on the first and second covers 14, 16. The side load may be sufficient to overcome the biasing load provided by the springs 56. As such, movement of the nozzle 38 toward the inlet port 20 and/or outlet port 32 causes the first and second covers 14, 16 to slide from their respective closed positions, as shown in FIG. 6, through several intermediate positions, as shown in FIGS. 7-9, to fully open positions, as shown in FIG. 10. The reverse effect may be achieved by withdrawing the nozzle 38 from the fitting 10.

Similar operation of the second embodiment is shown in FIGS. 13A-13F. FIGS. 13A-13F also show a tapered boot 76 associated with the nozzle 38. The tapered boot 76 (which may be made of rubber or another suitable material) may be partially or fully received within the tapered upper portion 36 of the outlet sleeve 30 when the nozzle 38 is fully inserted into the fitting 10. In any event, the tapered upper portion 36 of the outlet sleeve 30 may facilitate insertion of the nozzle 38 into the fitting 10.

Figure 4:
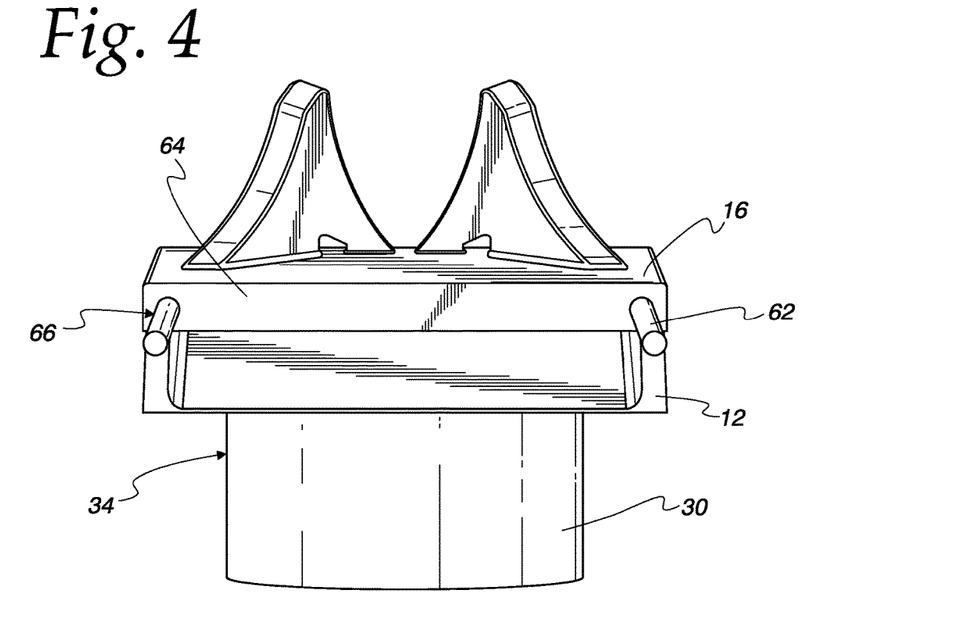
FIG. 4 is an end elevation view of the illustrative sewer inlet fitting of FIG. 1.

As best shown in FIGS. 7-10, the outlet sleeve 30 or the lower portion 34 thereof may be received within an inlet pipe 78 or other fitting of an in-ground or other sewage receptacle. In an embodiment, for example, as shown in FIGS. 3 and 4, the outlet sleeve 30 or the lower portion thereof 34 may have a constant outside diameter selected to fit inside any inlet pipe 78 having an inside diameter greater than the foregoing outside diameter.

Figure 14:
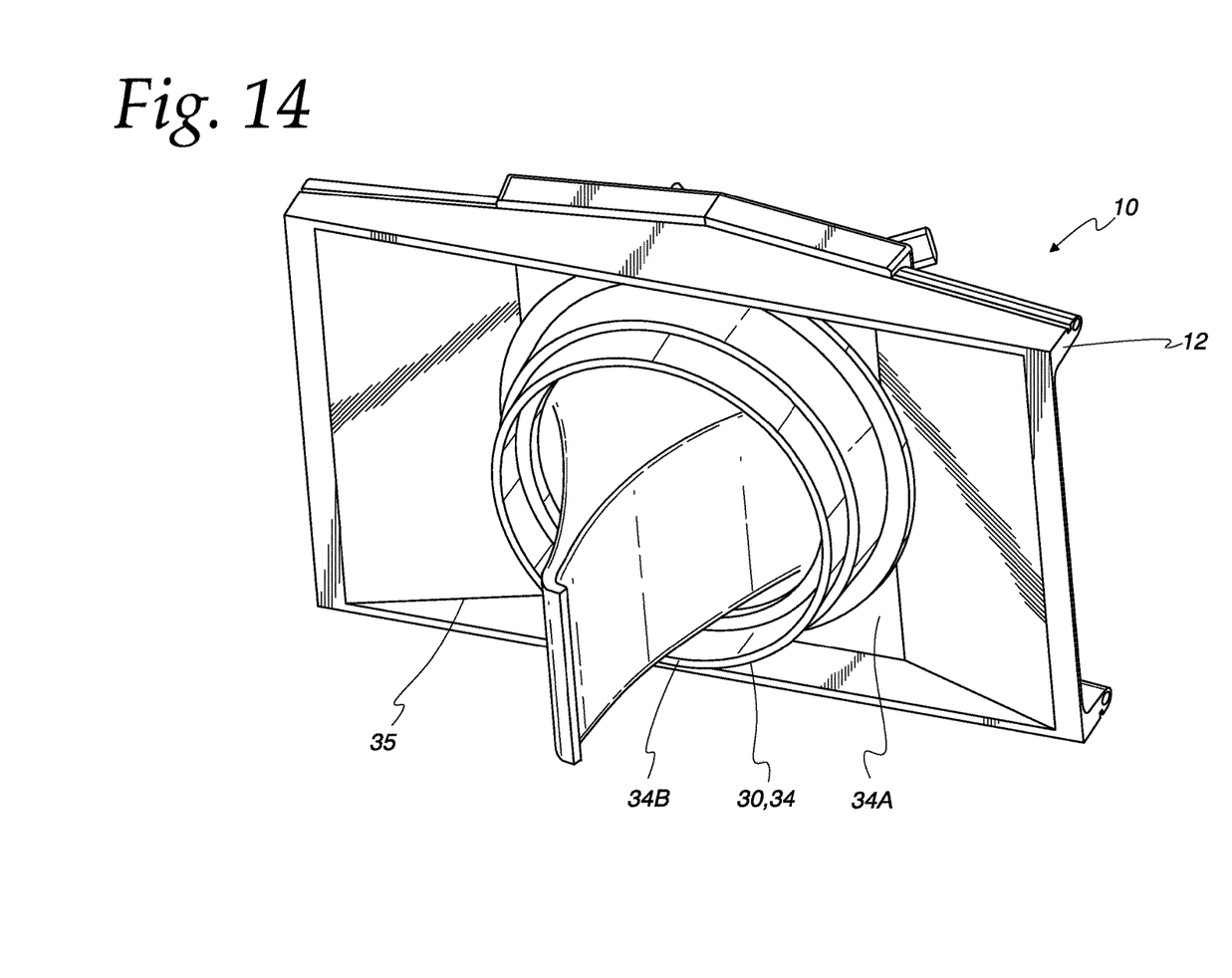
FIG. 14 is a bottom perspective view of yet another illustrative sewer inlet fitting according to the present disclosure.

In another embodiment, as shown in FIG. 14, the outlet sleeve 30 or the lower portion thereof 34 may be configured as a stepped annulus having a first portion 34A and a second portion 34B. The first portion 34A may have an outside diameter sized to fit within a sewer inlet pipe 78 of corresponding inside diameter. For example, the first portion 34A may be sized to fit snugly or loosely within a nominal four inch diameter sewer inlet pipe 78.

The second portion 34B may have an inside diameter sized to fit about or over a sewer inlet pipe 78 of corresponding outside diameter. For example, the second portion 34B may be sized to fit snugly or loosely about or over a nominal three and one-half inch sewer inlet pipe 78. A land 35 may be provided within the interior of the outlet sleeve 30, for example, a surface of a flange extending radially inwardly from the sidewall of the outlet sleeve, to provide a stop configured to engage with the end of sewer pipe 78 received therein.

Figure 5:
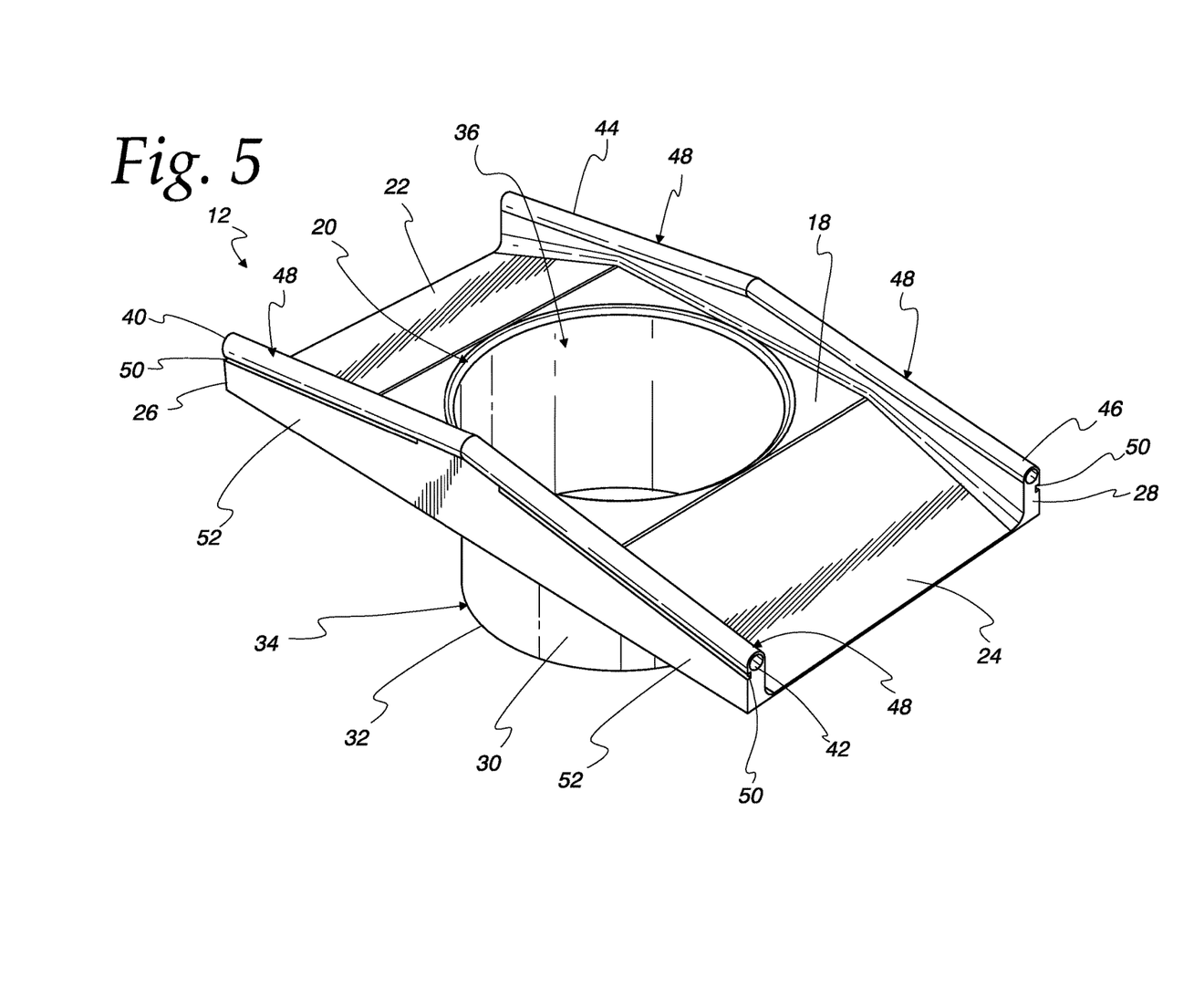
FIG. 5 is a perspective view of a base of the illustrative sewer inlet fitting of FIG. 1.

In an embodiment, as shown in FIG. 15, an inlet sleeve 80 may be disposed within the outlet sleeve 30. The inlet sleeve 80 is shown as including a rubber or elastomeric tube 82 attached to a ring 84. The ring 84 is configured to fit within an upper portion of the outlet sleeve 30. For example, the ring 84 may rest upon an upper surface of the land 35 shown in FIG. 14 or another land or stop within the upper portion 36 of the outlet sleeve 30. Alternatively, the ring 84 could rest upon a tapered inner surface of the outlet sleeve, for example, the tapered inner surface of the upper portion 36 of the outlet sleeve 30 as shown in FIG. 5. A retainer 90 may be provided to retain the ring 84 to the central portion 18 of the base 12. The retainer 90 may be configured as a plate 92 defining an opening therein and an annulus 94 extending downwardly from a lower surface thereof. The plate 92 also may define apertures 96 configured to receive mechanical fasteners 98 for attaching the retainer 90 to the base 12. The annulus 94, if provided, may be configured to fit within an interior region of the ring 84 in loose or secure engagement therewith.

The tube 82 could be configured with a tapering sidewall so that the lower end thereof may fit within the inside diameter of a sewer inlet pipe 78 having one of several inside diameters. For example, the lower end of the tube 82 could be configured to fit within the inside of either a four inch or three and one-half inch nominal diameter sewer inlet pipe 78. Further, the tube 82 could be configured to self-seal at the lower end thereof in the absence of a nozzle 38 or other structure inserted therein. For example, the tube 82 could be configured so that stresses internal to the material from which it is made cause the free end thereof to close upon itself. Such stresses may also cause the free end to curl upon itself in this condition. This feature may prevent sewer gas from escaping through the fitting 10 when not in use.

The embodiments shown and described herein are illustrative and the details thereof could be modified without departure from the scope of the appended claims. For example, features shown only in connection with one embodiment may be provided in connection with other embodiments, as well.

The invention claimed is:

1. A fitting comprising
a base having a central portion defining an inlet port having a longitudinal axis, first and second side portions extending from the base, first and second sidewalls defining respective first and second slide rails extending from the central portion and first and second side portions, and an outlet sleeve extending from a surface of the central portion; and
first and second covers slidingly engaged with the first and second slide rails, each of the first and second covers comprising a guide fin extending from an upper surface thereof, the guide fin defining a guide surface.

2. The fitting of claim 1 wherein the first and second portions are ramped with respect to the central portion.

3. The fitting of claim 1 wherein the outlet sleeve includes an annular portion.

4. The fitting of claim 3 wherein the outlet sleeve further includes a tapered portion between said base and said annular portion.

5. The fitting of claim 1, each of the first and second covers further comprising a second guide fin extending from the upper surface thereof.

6. The fitting of claim 5 further comprising a ramped hemispherical section connected between the first and second guide fins extending from the upper surface thereof.

7. The fitting of claim 1 wherein the guide surface is oriented at an oblique angle to the longitudinal axis of the inlet port.

8. The fitting of claim 7 further comprising:
a first biasing member connected between the base and the first cover, the first biasing member biasing the first cover to a first position covering a first portion of the inlet port; and
a second biasing member connected between the base and the second cover, the second biasing member biasing the second cover to a first position covering a second portion of the inlet port.

9. The fitting of claim 8, each of the first and second guide rails defining a tubular region, the first spring disposed within the tubular region defined by the first slide rail, and the second spring disposed within the tubular region defined by the second slide rail.

10. The fitting of claim 8 wherein the first biasing mechanism is an elastomeric band.

11. The fitting of claim 8 wherein application of a force to any of the guide surfaces in a direction parallel to the longitudinal axis of the inlet port causes the respective cover to slide from the first portion to a second position thereby at least partially uncovering the inlet port.

12. The fitting of claim 11 wherein withdrawal of the force causes the respective cover to slide from the second portion to the first position.

13. A system comprising a nozzle and a fitting configured to receive the nozzle, the fitting comprising:
a base having a central portion defining an inlet port having a longitudinal axis, first and second side portions extending from the base, first and second sidewalls defining respective first and second slide rails extending from the central portion and first and second side portions, and an outlet sleeve extending from a surface of the central portion; and
first and second covers slidingly engaged with the first and second slide rails, each of the first and second covers comprising a guide fin extending from an upper surface thereof, the guide fin defining a guide surface, the guide surfaces configured for selective sliding engagement by said nozzle.

14. The system of claim 13 wherein the guide surface is oriented at an oblique angle to the longitudinal axis of the inlet port.

15. The system of claim 14 further comprising:
a first biasing member connected between the base and the first cover, the first biasing member biasing the first cover to a first position covering a first portion of the inlet port; and
a second biasing member connected between the base and the second cover, the second biasing member biasing the second cover to a first position covering a second portion of the inlet port.

16. The fitting of claim 15, each of the first and second guide rails defining a tubular region, the first spring disposed within the tubular region defined by the first slide rail, and the second spring disposed within the tubular region defined by the second slide rail.

17. The fitting of claim 15 wherein application of a force to any of the guide surfaces in a direction parallel to the longitudinal axis of the inlet port causes the respective cover to slide from the first portion to a second position thereby at least partially uncovering the inlet port.

18. The system of claim 15 wherein sliding engagement of the nozzle with the guide surfaces along the longitudinal axis toward the outlet sleeve results in the first and second covers sliding from their respective first positions to positions at least partially uncovering the inlet port.

19. The system of claim 18 attached to an inlet fitting of a sewage receptacle.

20. A fitting comprising
a base having a central portion defining an inlet port having a longitudinal axis, first and second side portions extending from the base, first and second sidewalls defining respective first and second slide rails extending from the central portion and first and second side portions, and an outlet sleeve extending from a surface of the central portion;
first and second covers slidingly engaged with the first and second slide rails, each of the first and second covers comprising a guide fin extending from an upper surface thereof, the guide fin defining a guide surface; and a first biasing mechanism biasing the first cover to a first position covering a first portion of the inlet port;

the first biasing mechanism further biasing the second cover to a first position covering a second portion of the inlet port.

21. The fitting of claim 20 wherein the first biasing mechanism is a spring.

22. The fitting of claim 20 wherein the outlet sleeve comprises a first portion for connection to an exterior of a first mating pipe or fitting and a second portion for connection to an interior of a second mating pipe or fitting.

23. The fitting of claim 20 further comprising an inlet sleeve connected to the base, the inlet sleeve comprising a tube having a free end.

24. The fitting of claim 20 wherein the free end of the tube is self-sealing in the absence of a structure contained therein.

25. The fitting of claim 20 wherein the first or second biasing mechanism is a gas strut.

\* \* \* \* \*